US006337106B1

(12) United States Patent
Brown

(10) Patent No.: US 6,337,106 B1
(45) Date of Patent: Jan. 8, 2002

(54) METHOD OF PRODUCING A TWO-PACK FAST-SETTING WATERBORNE PAINT COMPOSITION AND THE PAINT COMPOSITION THEREFROM

(75) Inventor: Ward Thomas Brown, North Wales, PA (US)

(73) Assignee: Rohm and Haas, Phila, PA (US)

( * ) Notice: Subject to any disclaimer, the term of this patent is extended or adjusted under 35 U.S.C. 154(b) by 0 days.

(21) Appl. No.: 09/538,448

(22) Filed: Mar. 30, 2000

Related U.S. Application Data

(60) Provisional application No. 60/136,969, filed on Jun. 1, 1999.

(51) Int. Cl.$^7$ .............................. B05D 1/34; B05D 3/12
(52) U.S. Cl. ...................... 427/341; 427/337; 427/340; 524/431; 524/430
(58) Field of Search ................... 427/301, 337, 427/340, 341; 524/431, 430

(56) References Cited

U.S. PATENT DOCUMENTS

| | | | | |
|---|---|---|---|---|
| 4,122,143 A | * | 10/1978 | Momotari et al. ........... 264/104 |
| 4,367,298 A | | 1/1983 | Abbey et al. ................ 523/402 |
| 4,514,445 A | * | 4/1985 | Hokamura et al. .......... 427/410 |
| 4,525,493 A | * | 6/1985 | Omura et al. ............... 523/116 |
| 4,607,082 A | * | 8/1986 | McGinniss ................... 525/286 |
| 4,746,541 A | * | 5/1988 | Marikar et al. ........... 427/126.1 |
| 5,364,891 A | | 11/1994 | Pears et al. ................. 522/149 |
| 5,403,393 A | | 4/1995 | Dubble ....................... 106/277 |
| 5,494,961 A | | 2/1996 | Lavoie et al. ............... 525/102 |
| 5,672,379 A | | 9/1997 | Schall et al. ................ 427/137 |
| 5,804,627 A | | 9/1998 | Landy et al. ............... 524/314 |
| 5,820,993 A | | 10/1998 | Schall et al. ................ 428/447 |
| RE36,032 E | | 1/1999 | Tao et al. ...................... 514/58 |
| 5,922,398 A | | 7/1999 | Hermes et al. ............. 427/137 |
| 6,149,977 A | * | 11/2000 | Fischer et al. .............. 427/338 |

FOREIGN PATENT DOCUMENTS

| | | |
|---|---|---|
| EP | 0230 003 A | 7/1987 |
| EP | 0322 188 B1 | 10/1992 |
| EP | 0409459 A2 | 7/1999 |
| WO | WO94/29391 | 12/1994 |
| WO | WO 9633241 | 10/1996 |

* cited by examiner

Primary Examiner—Shrive P. Beck
Assistant Examiner—Kirsten A. Crockford
(74) Attorney, Agent, or Firm—James G. Vouros

(57) ABSTRACT

This invention relates to a method of producing a two-pack or multi-pack fast-setting waterborne paint composition, particularly a traffic paint, which has a reducing component in one pack and an oxidizing component in the other pack of the two-pack paint composition. The present invention also relates to the two-pack or multi-pack waterborne paint composition produced therefrom.

17 Claims, No Drawings

METHOD OF PRODUCING A TWO-PACK FAST-SETTING WATERBORNE PAINT COMPOSITION AND THE PAINT COMPOSITION THEREFROM

This application claims benefit of provisional application No. 60/136,969, filed Jun. 1, 1999.

This invention relates to a method of producing a two-pack or multi-pack fast-setting waterborne paint composition, particularly a traffic paint, which has a reducing component in one pack and an oxidizing component in the other pack of the two-pack paint composition. The present invention also relates to the two-pack waterborne paint composition produced in accordance with the method.

One of the many important features of coatings, particularly road markings or traffic paints is the speed at which they dry on the surface of a particular substrate after application. For instance, the drying speed of a traffic paint dictates the length of disruptions to road traffic in order to be able to apply the paint and allow the paint to dry properly. The trend is to demand shorter disruptions by using faster-drying (faster-setting) paint.

Conventional fast-drying coatings or paints compositions are based on organic polymeric resins (also called binders) dissolved, suspended or otherwise dispersed in relatively low-boiling organic solvents. Low-boiling organic solvents evaporate rapidly after application of the paint on the road to provide the desired fast drying characteristics of a freshly applied road marking. However, in addition to releasing organic solvents into the environment, this type paint formulation tends to expose the crew to the vapors of the organic solvents. Because of these shortcomings and increasingly stringent mandates from governments and communities, it is highly desirable to develop more environmentally friendly coatings or paints while retaining fast drying properties and/or characteristics.

A more environmentally friendly coating uses water based, i.e. waterborne, rather than organic solvent based polymers or resins (binders). Mainly due to a combination of water's high boiling point, high latent heat of vaporization, high polarity and hydrogen bonding, the drying times of waterborne paints or coatings are generally longer than those exhibited by the organic solvent based coatings.

WO 94/29391 discloses the use of a waterborne paint based on (a) a unique type of aqueous dispersion polymer as described in EP-B-0-322-188 and EP-A-409459, and (b) application of a water-soluble acid to the freshly applied paint. In view of the chemistry involved, it appears to be only useful for acid-coagulatable paint formulations.

U.S. Pat. No. 5,403,393 describes water-based coating compositions which comprise an aqueous anionically stabilized dispersion of water-insoluble polymer prepared by either emulsion polymerization or mechanical emulsification, inorganic pigment dispersed with anionic polymers, salt, or soaps and the propionic acid salt of calcium. The coatings upon application quickly develop resistance to being washed out by inadvertent precipitation.

It has been unexpectedly discovered that a two-pack or multi-pack waterborne quick-drying paint composition, which contains a binder, can be produced by placing a reducing component in one "pack" and an oxidizing component in the other "pack" and then mixing the two packs upon application on a surface of a substrate, or at a suitable time prior to the application. This pair of components is referred to herein as a "redox couple." The term "two-pack" is used herein to mean, as understood by those skilled in the art, that a paint composition consists of two separate parts or packs, which are combined either during or shortly before application of the paint on the surface. It is also within the scope of the present invention to use a multi-pack composition. The binder may be in either or both packs in a two pack composition, depending on the chemical and physical properties and compatibilities of the binder, the oxidizing component and the reducing component selected. Alternately, the binder may in a third pack in a multi-pack composition.

The present invention can be used in many coating, painting or marking applications. For instance, the invented method and composition can be used for traffic paints, road markings, house paints, maintenance coating for exterior or interior surfaces of buildings, walls, roof, ceiling, and other structures. Other applications include coating metal surfaces of a variety of objects such as signs, boats, cars, etc. All the surfaces may already have one or more layers of existing coating or paint. All the surfaces may also have a primer.

When discussing road markings or traffic paints, the term "road" is used herein as a generic term. It includes any indoor or outdoor solid surface which is or may be exposed to pedestrians, moving vehicles, tractors, other moving objects or aircrafts continuously, constantly or intermittently. Some non-limiting examples of a "road" include highways, streets, driveways, sidewalks, runways, taxiing areas, tarmac areas, parking lots, rooftops, indoor floors (such as in a shopping mall), etc. The surface material may be masonry, tar, asphalt, resins, concrete, cement, stone, stucco, tiles, polymeric materials, wood and combinations thereof. It is also within the scope of the invention to apply such a two or multi-component waterborne coating over another fresh or aged coating or marking already applied on the surface. There also may be a primer on the surface.

The terms "fast drying", "faster drying", "rapid setting", "fast-setting", "fast drying property", "increased drying" and "accelerated drying" are used interchangeably herein to mean that a two or multi-component composition prepared and used in accordance with the method of the present invention has a drying time which is shorter than that of a composition used without using the oxidizing component/reducing component composition. Drying speed is typically measured by "dry-through time" in accordance with a standard testing method, ASTM D1640 with the exception that no thumb pressure is used. For the present invention, it is preferred that the dry-through time of the paint or coating composition(s) is one hour or less at 25° C. and 90% RH (relative humidity).

In the present invention, there are several general requirements for both the oxidizing component and the reducing component. First, the oxidizing component and the reducing component must be compatible with other compounds and materials present in the two or multi packs. This compatibility requirement may limit which compound may have to go with the oxidizing component in one pack, and which may have to go with reducing component in the other pack. Second, both components must be relatively stable in the individual packs under storage conditions. This would allow the two separate packs to have reasonable shelf lives prior to use. Third, in order to be useful for as many paint colors as possible, it is preferred that both components and their reaction products are not highly colored. Fourth, the reaction between the oxidizing component and the reducing component should be completed within a relative short period of time, particularly for a fast-drying paint composition. A period of less than five minutes is preferred within the scope of the present invention. Depending on the mode of application, a very short reaction time, 0.1 seconds to 60 seconds, may or may not be preferred because the finished coating or marking may not possess the desired finish and/or other properties.

A characteristic of a suitable reducing component is that they can form ions of a valence state of at least +1, preferably +2 or higher, upon being oxidized. Another preferred characteristic of a suitable reducing component is that they can form, upon being oxidized, ions of a higher positive charge than those, if any, found in the oxidizing component. The reducing components may be organic, inorganic, organometallic or combinations thereof. Examples of a suitable inorganic reducing component include, but are not necessarily limited to, metal-containing compounds such as elemental metal, ferrous compounds, cobaltous compounds, stannous compounds, and mixtures thereof. Some specific reducing components include elemental aluminum, ferrous sulfate, cobaltous chloride, cobaltous acetate, stannous sulfate and mixtures thereof. The specific chemical compounds also include their respective hydrates, if there are any. In order for a mixture to be suitable, chemical compatibility must exist among the various individual components.

Oxidizing components suitable for the present invention can be organic, inorganic, organometallic or combinations. They must have a Standard Reduction Potential that is more positive than that of the reducing compound. See *Handbook of Chemistry and Physics*, CRC Press Inc. 8–21 to 8–31, David R. Lide, Editor-in-Chief, 76th Edition (1995–1996). Examples of a suitable oxidizing component for the present invention include, but are not necessarily limited to cupric (copperII+) compounds, such as cupric chloride, cupric bromide; chlorites such as sodium chlorite ($NaClO_2$), hypochlorites such as sodium hypochlorite, perchlorates such as potassium perchlorate; and mixtures thereof The specific chemical compounds also include their respective hydrates, if there are any. In order for an oxidizing component mixture to be suitable, chemical compatibility must exist among the various individual components.

The oxidizing component and the reducing component do not have to be soluble in the respective "pack" to be suitable for the present invention. However, in order to have a good contact, good reaction rate and fast-setting properties, it is preferred that at least one of the two components should have a good solubility in water, greater than 1 g per 100 g of water, more preferred greater than 10 g per 100 g of water. If one component is not soluble, it is preferred that it is in a fine powder form, a suspension, a micelle, or a colloid. The particle size of such powder, suspension, micelle or colloid is preferred to be in the range of from 0.1 micrometers(microns, or "$\mu$") to 100 micrometers, more preferably in the range of from 1 micrometer to 50 micrometers.

It is also important to have an oxidizing component in one pack which has a reduction potential compatible with the oxidation potential of the reducing component in the other pack.

Examples of a suitable "redox pair" include, but are not necessarily limited to (1) oxidizing component consisting essentially of cupric chloride ($CuCl_2$) and reducing component consisting essentially of $Al_{(s)}$, (2) oxidizing component consisting essentially of $NaClO_2$ and reducing component consisting essentially of $Al_{(s)}$ and (3) oxidizing component consisting essentially of $NaClO_2$ and reducing component consisting essentially of $SnSO_4$. The "(s)" means that the aluminum, Al, used is in a solid form.

There several ways of mixing the components: for "redox pairs" which have relatively long reaction times, the components can be mixed by hand, or with the use of an electric paddle-type mixer. In all cases, the components can be mixed by use of a two-component mixing spray system. When the components are to be mixed in ratios in the range of from 18:1 to 1:18, mixing spray systems such as the Graco models 226–932 or 226–930 can be used. When the components are to be mixed in ratios of $\geq 18:1$ or $\leq 1:18$, mixing spray systems such as the DeVilbiss Pro Bond 2K™ can be used.

There must be one or more binders in one or both packs in a two-pack waterborne fast-setting paint composition. The binder(s) selected must have enough chemical and physical compatibilities with the oxidizing and/or reducing component to provide sufficient shelf-stability prior to application. It is possible to keep incompatible substances separate as a multi-pack composition. In this case, the several packs are applied to a surface in such a manner and order as disclosed herein to produce a desirable type of coating on the surface.

Many different types of binder may be used for the present invention, including conventional binders, fast-dry binders, wear-resistant binders and a combination thereof. Suitable binders fall into two general types. The first type includes those waterborne anionically stabilized emulsion polymers which are anionically charged. The second type includes waterborne nonionic polymers which are in a stabilized emulsion state in the presence of anionic surfactants or emulsifiers. Suitable anionic surfactants or emulsifiers include, but are not necessarily limited to alkyl or aryl sulfates, alkyl or aryl sulfonates, alkyl or aryl phosphates, alkyl or aryl phosphonates, and alkyl or aryl carboxylates. Examples of suitable anionic surfactants include sodium laural sulfate, sodium dodecyl sulfate, Triton® H-55, and monosodium N-cocyl-L-glutamate. Triton is a registered trademark owned by Union Carbide Corporation.

Many of these binders have been described in U.S. Pat. Nos. 5,820,993; 5,804,627, 5,672,379, and U.S. Pat. No. RE 36,032. To the extent that various binders and coating compositions are disclosed in these patents, they are incorporated herein by reference. Waterborne anionically stabilized polymers (the "first type" described above), most of them prepared by aqueous emulsion polymerizations, are most preferred for the present invention. These binders may be prepared by a number processes such as those described in "*Emulsion Polymerization of Acrylic Monomers*" published by Rohm and Haas Company, May 1966.

In general, it is preferred for the binder to have a glass transition temperature (Tg) at 0° C. or higher and a GPC number average molecular weight (Mn) varying in the range of from 1000 to 1000,000, preferably in the range of from 5000 to 200,000, and more preferably in the range of from 5000 to 50,000. The binders may also possess multiple Tg's one of which may be lower than 0° C.

In general, the solids content of a paint would be as high as possible while maintaining reasonable application viscosity. Paint's solids can be anywhere in the range of from 20 to 90% on a volume basis, preferably in the range of from 40 to 70%, more preferable in the range of from 50 to 65%. The binder solids need only be high enough to achieve the desired paint solids content of the paint formulation.

Some examples of polymeric materials suitable for use as a binder in the first component of the two- or multi-component waterborne composition of the present invention are polymerized or copolymerized from at least one monomer selected from the group consisting of acrylic, methacrylic and crotonic ester monomers including, but not necessarily limited to methyl (meth)acrylate or crotonate, ethyl (meth)acrylate or crotonate, n-propyl (meth)acrylate or crotonate, n-butyl (meth)acrylate or crotonate, 2-ethylhexyl (meth)acrylate or crotonate, decyl (meth)acrylate or crotonate, lauryl (meth)acrylate, isobornyl (meth)acrylate, isodecyl (meth)acrylate, oleyl (meth)acrylate, palmityl (meth)acrylate, stearyl (meth)acrylate, 2-hydroxyethyl (meth)acrylate or crotonate, 3-hydroxypropyl (meth)acrylate or crotonate, 4-hydroxybutyl (meth)acrylate or crotonate, glycidyl (meth)acrylate; acid functional monomers, such as, acrylic acid, methacrylic acid, crotonic acid, itaconic acid, citraconic acid, fumaric acid and maleic acid; monomethyl itaconate; monomethyl citraconate; monomethyl fumarate; mono(n-butyl)fumarate; maleic anhydride; citraconic anhydride, acrylamide or substituted acrylamides; sodium vinyl sulfonate; phosphoethyl(meth) acrylate; acrylamido propane sulfonate; diacetone acrylamide; glycidyl methacrylate; acetoacetyl ethylmethacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N'-dimethylamino (meth)acrylate and acrylonitrile or methacrylonitrile.

Another embodiment of the present invention relates to polymeric materials or binders co-polymerized from at least one nitrogen-containing monomer with other monomers as described above. To the extent they disclose such nitrogen-containing monomers and other monomers, U.S. patent application Ser. No. 08/812,492, U.S. Pat. Nos. 5,364,891, 5,494,961 and 4,367,298 are incorporated herein by reference. Useful methods include addition polymerization of ethylenically unsaturated monomers containing amine-functionality; polymerization of monomers which readily generate amines by hydrolysis; reactions of aziridines with carboxyl-containing polymers; reactions of polymers containing an enolic carbonyl group, e.g., acetoacetoxyethyl methacrylate ("AAEM"), and diamines; reactions of amines with epoxy-containing polymers; and reactions of amine with polymers of vinyl benzyl chloride.

There may also be one or more polyfunctional amines or polyimines (such as polyethyleneimine) in the component containing the binder. Many monomers may be polymerized to form such polyfunctional amines or imines. To the extent they disclose such monomers, U.S. Pat. Nos. 5,804,627; 5,672,379; and U.S. Pat. No. RE 36,032 are incorporated herein by reference. Examples include, but are not necessarily limited to aminoalkyl vinyl ethers, aminoalkyl vinyl sulfides, α,β unsaturated acrylamides with C=C double bonds, N-acryloxyalkyloxazolidines, N-acryloxyalkyltetrahydro- 1,3-oxazines, aziridines and others. More specific examples are ethyleneimine, propyleneimine and those disclosed in U.S. Pat. No. 5,804,627, column 3, line 52 to column 6, line 26, incorporated herein by reference. The preparation method is the same as that disclosed in U.S. Pat. No. 5,804,627, column 6, lines 27–59, also incorporated herein by reference. Many of the monomers may contain functional groups which can be converted into amino function groups by reactions like hydrolysis.

It is also preferred to have a base in the first component along with a waterborne anionically stabilized binder, particularly when a polyfunctional amine/imine and/or a binder co-polymerized from at least one nitrogen-containing monomer as described herein. Low molecular weight alkyl amines and ammonia (or its aqueous form—ammonium hydroxide) are examples of bases. Alkyl amines that fall within this category include methyl amine, dimethyl amine, trimethyl amine, ethyl amine, methyl ethyl amine, diethyl amine, triethyl amine, ethanol amine, diethyl hydroxyl amine, ethylene diamine, and mixtures thereof. A number of heavier amines also may be used. Examples include morpholine, piperazine, cyclohexylamine, aniline, pyridine, mixtures thereof, and mixtures thereof with other alkylamines or ammonia. It is preferred to use a base or a base mixture which is relatively volatile or has a relatively high vapor pressure, viz greater than 5 kPa, preferably greater than 20 kPa, at a temperature in the range of 0° C. to 50° C. Ammonia (or its aqueous equivalent—ammonium hydroxide solution having various concentrations) is a most preferred base when a volatile base is used.

The amount of a base or a base mixture in the first component which also contains an anionically stabilized binder may be in a wide range of concentrations, from 0.01 wt % to 75 wt %, based on the total weight of the binder present. A preferred concentration is in the range of from 0.1 wt % to 60 wt %, more preferred in the range of from 1 wt % to 50 wt %, all based on the total weight of the binder present in the first component. If a polyamine or a polyimine is present in the binder, it is preferred to have an amount of the base which is sufficient to maintain substantially all the nitrogen-containing functional groups in a non-ionic or substantially non-ionic state (non-protonated state). Polyethyleneimine (PEI) and polypropyleneimine are among the preferred polyimines. PEI may be obtained from Aldrich Chemical Company, Sigma Chemical Company, ICN Biomedicals, Inc. and others.

A preferred pH of the first component is in the range of from 7 to 11.5, more preferred from 7.5 to 10. This pH may be obtained or achieved by using many different reagents or methods. One example is to add a base, organic, inorganic, or mixtures thereof, to the component to adjust the pH to the desired level. As described in the preceding paragraph, a desirable pH in the presence of a polyamine or polyimine is to deprotonate all or substantially all amino functional groups.

To further improve other properties such as wear-resistance of traffic paints, other additives or certain silicon-containing monomers may be added or incorporated into either the final formulation and/or the binder and/or a polyfunctional amine. It is also within the scope of the present invention to incorporate an enamine functionality into the binder composition. To the extent they disclose such additives, functional groups, monomers, polymers or copolymers, U.S. Pat. Nos. 5,820,993 and 5,672,379 are incorporated herein by reference.

It is generally desirable and depending on the intended use of the paint, additional components may be added to the composition. These additional components include but are not limited to thickeners; rheology modifiers; dyes; sequestering agents; biocides; dispersants; pigments, such as, titanium dioxide, organic pigments, carbon black; extenders, such as, calcium carbonate, talc, clays, silicas and silicates; fillers, such as, glass or polymeric microspheres, quartz and sand; anti-freeze agents; plasticizers; adhesion promoters; coalescent; wetting agents; waxes; surfactants; slip additives; crosslinking agents; defoamers; colorants; tackifiers; waxes; preservatives; freeze/thaw protectors, corrosion inhibitors; anti-flocculants; and alkali or water soluble polymers.

Glass beads, quartz beads or ceramic beads which generally provide beneficial reflective properties to traffic paints or road marking coatings, particularly for night time driving.

They are collectively referred to herein as "glass beads." The particle size of glass beads is in the range of from 50μ to 1500μ, preferably 80μ to 1250μ, more preferably in the range of from 100μ to 1000μ. Glass beads can be obtained from various commercial sources like Potters Industries, Inc. (PQ Corporation), Minnesota Mining and Manufacturing Company (3M), and others. Typical glass beads useful for this application are those described in AASHTO Designation M 247-81 (1993), developed by the American Association of State Highway and Transportation Officials (Washington, D.C.). The glass beads generally are applied at a rate of 0.72–2.9 kg/L or more of paint for night and adverse weather visibility.

The following are illustrative examples of this invention and comparative examples.

EXAMPLE (INVENTION)[a]

The following base paint was made by combining the ingredients in the order listed while stirring.

| | |
|---|---|
| Rhoplex AC-630 | 460.1 g |
| Tamol 901 | 7.2 g |
| Surfynol CT-136 | 2.8 g |
| Drew L-493 | 2.0 g |
| Ti-Pure R-900 | 100.0 g |
| Omyacarb 5 | 760.6 g |
| premix: | |
| methanol | 30.0 g |
| Texanol | 23.0 g |
| water | 11.6 g |
| Natrosol 250HR (2%) | 7.0 g |
| Drewplus L-493 | 3.5 g |
| water | amount necessary for viscosity = 71 KU |

The following 2-pack paint systems were made:

TABLE A

| Paint# | P1 | P2 | P3 |
|---|---|---|---|
| Pack 1 | | | |
| Base paint | 50 g | 20 g | 20 g |
| Sparkle Silver 3641 (Al flake) | 0.2 g | | |
| FeSO$_4$ (15.5% in H$_2$O) | | 0.55 g | |
| SnSO$_4$ | | | 0.15 g |
| Pack 2 | | | |
| CuCl$_2$ (22% in H$_2$O) | 0.45 g | | |
| NaClO$_2$ (16.7% in H$_2$O) | | 0.12 g | |
| NaClO$_2$ (33.3% in H$_2$O) | | | 0.4 g | a: Rhoplex and Tamol (registered trademarks); Rhoplex AC-630 binder and Tamol 901 Dispersant, an ammonium salt of an polyelectrolyte were supplied by Rohm and Haas Company, Philadelphia, Pennsylvania @ 30 percent based on the solids; Surfynol (a registered trademark) CT-136 Surfactant, an acetylenic surfactant was supplied by Air Products and Chemicals, Inc., Allentown, Pennsylvania; Drewplus (a registered trademark) L-493 defoamer supplied by Ashland Chemical Company, Drew Industrial Division, Boonton, New Jersey; Ti-Pure (a registered trademark) R-900 titanium dioxide was supplied by E.I. duPont de Nemours & Company, Wilmington, Delaware; Omyacarb (a registered trademark) 5 was supplied by Pluess-Staufer Industries, Inc., Proctor, Vermont; Texanol (a registered trademark) ester alcohol was supplied by Eastman Chemicals, Kingsport, Tennessee; Sparkle Silver (a registered trademark) was supplied by Silberline Manufacturing Company, Inc.

Pack 1 of the paints was placed into a plastic cup. While stirring, Pack 2 was injected rapidly into Pack 1, and the paint was observed for any visible signs of viscosity change. In all cases, the viscosity appeared to remain essentially unchanged until a sudden gelation occurred. The time to gelation was recorded and is given below.

TABLE B

| Paint# | P1 | P2 | P3 |
|---|---|---|---|
| Time to gel (sec) | 30 | <1 | 30 |

The following paints were made:

TABLE C

| Paint# | CP1 | CP2 | CP3 | CP4 | CP5 | CP6 |
|---|---|---|---|---|---|---|
| Base paint | 50 g | 20 g | 20 g | 50 g | 20 g | 20 g |
| Silver Sparkle 3641 (Al flake) | 0.2 g | | | | | |
| FeSO$_4$ (15.5% in H$_2$O) | | 0.55 g | | | | |
| SnSO$_4$ | | | 0.15 g | | | |
| CuCl$_2$ (22% in H$_2$O) | | | | 0.45 g | | |
| NaClO$_2$ (16.7% in H$_2$O) | | | | | 0.12 g | |
| NaClO$_2$ (33.3% in H$_2$O) | | | | | | 0.4 g |

None of these comparative paints were found to have gelled within 1 hour drying time.

The results from paints P1–P3 showed that a rapid setting 2-pack paint can be made by including appropriate oxidizing compounds in one pack, and appropriate reducing compounds in the second pack, and then combining the two packs. The results from comparative paints CP1–CP6 show that inclusion of only the oxidizing compound or only the reducing compound does not cause the paint to set quickly.

The examples described herein are intended for illustration purposes of only. They should not be interpreted to limit the spirit or the scope of the present invention which is defined herein by the claims and the specification.

I claim:

1. A method for producing a fast-setting two-pack waterborne paint composition comprising a binder, wherein the method comprises: preparing a first pack which comprises a reducing component; preparing a second pack which comprises an oxidizing component; and combining the first pack with the second pack; wherein the binder is selected from the group consisting of waterborne anionically stabilized emulsion polymers which are anionically charged, waterborne nonionic polymers which are in a stabilized emulsion state in the presence of anionic surfactants or emulsifiers, and mixtures thereof.

2. The method of claim 1, wherein the combining is carried out in a manner selected from the group consisting of mixing simultaneously during an application on a substrate, mixing prior to the application, applying the first pack on a substrate followed by applying the second pack, and applying the second pack first on the substrate followed by applying the first pack.

3. The method of claim 1, wherein the reducing component is selected from the group consisting of an elemental metal, ferrous compound, cobaltous compound, stannous compound, and mixtures thereof.

4. The method of claim 3, wherein the reducing component is selected from the group consisting of elemental aluminum, ferrous sulfate, cobaltous chloride, cobaltous acetate, stannous sulfate and mixtures thereof.

5. The method of claim 1, wherein the oxidizing component is selected from the group consisting of a cupric compound, a chlorite, a hypochlorite, a perchlorate and mixtures thereof.

6. The method of claim 5, wherein the oxidizing component is selected from the group consisting of cupric chloride (CuCl$_2$), cupric bromide, sodium chlorite (NaClO$_2$) and mixtures thereof.

7. The method of claim 1, wherein the oxidizing component and the reducing component are selected from the group consisting of redox pairs of (1) the oxidizing component consisting essentially of CuCl$_2$ and the reducing component consisting essentially of Al(s), (2) the oxidizing component consisting essentially of NaClO$_2$, and the reducing component consisting essentially of Al(s) and (3) the oxidizing component consisting essentially of NaClO$_2$ and the reducing component consisting essentially of SnSO$_4$.

8. The method of claim 2, wherein the reducing component is selected from the group consisting of an elemental metal, ferrous compound, cobaltous compound, stannous compound, and mixtures thereof, and wherein the oxidizing component is selected from the group consisting of a cupric compound, a chlorite, a hypochlorite, a perchlorate and mixtures thereof.

9. The method of claim 2, wherein the reducing component is selected from the group consisting of elemental aluminum, ferrous sulfate, cobaltous chloride, cobaltous acetate, stannous sulfate and mixtures thereof and wherein the oxidizing component is selected from the group consisting of cupric chloride (CuCl$_2$), cupric bromide, sodium chlorite (NaClO$_2$) and mixtures thereof.

10. The method of claim 2, wherein the oxidizing component and the reducing component are selected from the group consisting of redox pairs of (1) the oxidizing component consisting essentially of CuCl2 and the reducing component consisting essentially of Al(s), (2) the oxidizing component consisting essentially of NaCl2, and the reducing component consisting essentially of Al(s) and (3) the oxidizing component consisting essentially of NaClO$_2$ and the reducing component consisting essentially of SnSO$_4$.

11. A method for reducing the setting time of a waterborne paint composition, wherein the method comprises:

preparing a fast-setting two-pack waterborne paint composition, wherein the first pack comprises a reducing component and optionally comprises a binder; wherein the second pack comprises an oxidizing component and optionally comprises a binder; and wherein at least one of the packs comprises a binder, wherein the binder is selected from the group consisting of waterborne anionically stabilized emulsion polymers which are anionically charged, waterborne nonionic polymers which are in a stabilized emulsion state in the presence of anionic surfactants or emulsifiers, and mixtures thereof;

combining the first pack with the second pack;

applying the composition to a surface;

drying the composition or allowing it to dry.

12. The method of claim 11, wherein the reducing component is selected from the group consisting of an elemental metal, ferrous compound, cobaltous compound, stannous compound, and mixtures thereof.

13. The method of claim 12, wherein the reducing component is selected from the group consisting of elemental aluminum, ferrous sulfate, cobaltous chloride, cobaltous acetate, stannous sulfate and mixtures thereof.

14. The method of claim 11, wherein the oxidizing component is selected from the group consisting of a cupric compound, a chlorite, a hypochlorite, a perchlorate and mixtures thereof.

15. The method of claim 14, wherein the oxidizing component is selected from the group consisting of cupric chloride (CuCl$_2$), cupric bromide, sodium chlorite (NaClO$_2$) and mixtures thereof.

16. The method of claim 11, wherein the oxidizing component and the reducing component are selected from the group consisting of redox pairs of (1) the oxidizing component consisting essentially of CuCl$_2$ and the reducing component consisting essentially of Al(s), (2) the oxidizing component consisting essentially of NaClO$_2$, and the reducing component consisting essentially of Al(s) and (3) the oxidizing component consisting essentially of NaCl$_2$ and the reducing component consisting essentially of SnSO$_4$.

17. A two-pack fast-setting waterborne paint composition comprising a binder, a first pack which comprises a reducing component and a second pack which comprises an oxidizing component, wherein the reducing component is selected from the group consisting of an elemental metal, a ferrous compound, a cobaltous compound, a stannous compound, and mixtures thereof; and the oxidizing component is selected from the group consisting of a cupric compound, a chlorite, a hypochlorite, a perchlorate, and mixtures thereof; and the binder is selected from the group consisting of waterborne anionically stabilized emulsion polymers which are anionically charged, waterborne nonionic polymers which are in a stabilized emulsion state in the presence of anionic surfactants or emulsifiers, and mixtures thereof.

\* \* \* \* \*